United States Patent [19]
Garr et al.

[11] Patent Number: 6,008,555
[45] Date of Patent: Dec. 28, 1999

[54] ELECTRIC MOTOR AND A METHOD FOR MAKING AN ELECTRIC MOTOR

[76] Inventors: Keith E. Garr, 7315 Tulagi Trail, Rockford, Ill. 61108; Larry J. Kintz, Jr., 1518 Fenceline Dr., Rockford, Ill. 61103; Denise L. LoFasto, 7050 Horizon Dr., Rockford, Ill. 61109; Alida I. Santana, P.O. Box 207, Santa Isabel, Puerto Rico 00757; Wilfredo E. Colon, Los Caobos 927, Acerola St., Ponce, Puerto Rico 00731; Ricardo Jusino, P.O. Box 719, Santa Isabel, Puerto Rico 00759

[21] Appl. No.: 09/213,549

[22] Filed: Dec. 17, 1998

[51] Int. Cl.⁶ .................................................. H02K 11/00
[52] U.S. Cl. ..................... 310/68 C; 310/68 R; 310/260; 310/62
[58] Field of Search ................................ 310/68 R, 68 C, 310/62, 60 C, 260, 68 A, 66; 29/596

[56] References Cited

U.S. PATENT DOCUMENTS

| | | |
|---|---|---|
| 281,904 | 7/1883 | McMahan . |
| 361,273 | 4/1887 | Easton . |
| 1,075,882 | 10/1913 | Walters . |
| 1,199,750 | 10/1916 | Aikman . |
| 2,066,904 | 1/1937 | Bartmess ................................. 175/294 |
| 2,191,158 | 2/1940 | Potter ..................................... 172/274 |
| 2,471,840 | 5/1949 | Seely ...................................... 171/252 |
| 2,807,727 | 9/1957 | Fermi et al. ............................ 250/108 |
| 4,132,913 | 1/1979 | Lautner et al. ....................... 310/68 C |
| 4,181,393 | 1/1980 | Lill ....................................... 310/68 C |
| 4,186,318 | 1/1980 | Anderson ............................. 310/68 C |
| 4,188,553 | 2/1980 | Wheaton ............................... 310/68 C |
| 4,517,518 | 5/1985 | Ishigaki ................................... 328/165 |
| 5,032,749 | 7/1991 | Stone .................................... 310/68 C |
| 5,343,613 | 9/1994 | Kintz et al. ............................... 29/596 |
| 5,687,823 | 11/1997 | Nakagawa et al. ................... 310/68 C |

FOREIGN PATENT DOCUMENTS

| | | |
|---|---|---|
| 408019222A | 1/1996 | Japan . |
| 1607051 A1 | 11/1990 | Russian Federation . |

OTHER PUBLICATIONS

Abstract of Japanies Patent JP408019222A.
Sundstrand Aviation— Overhaul Manual With IPL, P/N 112–508–02, p. 420 (Jun. 15, 1983).
Technical Bulletin, Technical Bulletin TCO–A, Application and Installation of MICROTEMP® Thermal Cutoffs, 4 pages (May, 1998).

*Primary Examiner*—Nestor Ramirez
*Assistant Examiner*—Saeed Ghahramani
*Attorney, Agent, or Firm*—Marshall, O'Toole, Gerstein, Murray & Borun

[57] ABSTRACT

An electric motor includes a stator assembly having an annular stator core with an inner diameter and an outer diameter. The inner diameter is formed with a plurality of winding slots extending from a first end of the stator core to a second end of the stator core. A plurality of windings are disposed within the winding slots beginning with a first slots. The windings are coupled into at least one winding group associated with at least a first phase, and each winding has a first winding end and a second winding end extending from the first end and the second end, respectively, of the stator core. At least one thermal fuse is disposed in thermal contact with the first winding end and substantially adjacent to the first winding portion.

22 Claims, 5 Drawing Sheets

ELECTRIC MOTOR AND A METHOD FOR MAKING AN ELECTRIC MOTOR

FIELD OF THE INVENTION

The present invention relates generally to electric motors, and more particularly, the present invention relates to a stator for an electric motor and to a method for making a stator for an electric motor.

BACKGROUND OF THE INVENTION

Dynamoelectric machines, for example electric motors, find numerous uses as prime movers. One application is fuel delivery where electric motors are used to drive pumps for providing pressurized fuel to combustion engines. In some of these "electric" fuel pump applications, the pump assembly and the electric motor are disposed within the tank from which fuel is being pumped. This arrangement, in fact, is typical for fuel delivery pumps and fuel boost pumps found on jet aircraft.

When used in fuel delivery applications, care must be taken to ensure a failure of the motor does not cause an ignition of the fuel, principally fuel vapor, within the tank. While extreme care is exercised to prevent motor failures, some motor failures are inevitable. One failure mode is caused by the wearing out over time in service of the insulation materials separating the coils of the motor stator. Heat is generated within the motor during normal operation which over time can lead to the degradation of the insulation materials. Excessive heat, such as resulting from application of excessive amounts of current to the motor or from application of current to the motor with the rotor in a locked condition, accelerates the breakdown of the insulation materials. Poor wiring connections, such as between the coil windings and fuses and/or terminal leads may also lead to a motor failure. The high resistance of a poor wiring connection may create excess heat, which can degrade or burn away insulation materials or potentially melt the wire forming the connection. A common result of these failure modes is the formation of a short-circuit between one or more of the stator coils.

In multi-phase motors, for example three-phase motors, a failure resulting in a short-circuit between the coils of two separate phases may result in a voltage differential, line-to-line voltage, up to $\sqrt{3}$ times the line voltage. In a failure resulting in a short-circuit between a coil and neutral, a voltage differential up to the line voltage may result. In either failure event, a great deal of energy is released from the windings often as an electrical arc or plasma discharge. Discharges having sufficient energy to perforate the metal walls of multiple housing members within which the pump assembly and electric motor are contained have been observed. Perforation of the walls of the motor housing where the motor is used in fuel delivery applications may have significant detrimental effects including the potential ignition of fuel vapor within the fuel tank.

A hazardous yet typical location for the failure of a fuel pump motor stator winding is the end turns region of the motor stator. If a sufficiently large "air gap" is provided between the outer diameter of the stator and more particularly an outer diameter of the end turns of the stator and the motor housing wall inner diameter, enough of the energy of the arc is dissipated within the air gap such that perforation of the housing wall is substantially avoided. Additionally, controlling the above-described failure modes to both limit the occurrence of failure and the energy associated with a failure reduces the likelihood that a failure resulting in the perforation of the motor housing will occur.

Unconvinced that present electric fuel pump motors sufficiently protect against housing wall perforation in the event of fuel pump motor failure, the Federal Aviation Administration has issued directives requiring that certain jet aircraft maintain a minimum fuel quantity within the tanks at all times during operation. The minimum fuel quantity ensures that the electric fuel pump assembly remains submerged within liquid fuel while the aircraft is in service. Should an arc be discharged from the fuel pump due to a motor failure while the fuel pump is submerged in liquid fuel, there is insufficient oxygen available within the liquid fuel to result in ignition. However, maintaining a minimum quantity of fuel within the tanks significantly limits the range of aircraft. In fact, some commercial passenger long-range, non-stop flights have been discontinued as a result of these directives. These flights now require a refueling stop-over that adds to both the time and cost of the flight.

SUMMARY OF THE INVENTION

The present invention provides an electric motor, and particularly a stator assembly for an electric motor, which reduces the likelihood of motor failure, reduces the energy associated with motor failure, and substantially contains an energy discharge resulting from a motor failure. A motor in accordance with the present invention is therefore well suited for use in fuel delivery applications.

In accordance with a preferred embodiment of the present invention, a stator assembly includes an annular stator core having an inner diameter and an outer diameter. The inner diameter is formed with a plurality of winding slots extending from a first end of the stator core to a second end of the stator core. A plurality of windings are disposed within the winding slots beginning with a first slot. The windings are coupled into at least one winding group associated with at least a first phase, and each winding has a first winding end and a second winding end extending from the first end and the second end, respectively, of the stator core. At least one thermal fuse is disposed in thermal contact with the first winding end and substantially adjacent to the first winding portion.

In one aspect of the present invention, the first lead and the second lead of the thermal fuse are substantially aligned with a circumference of the stator core. A first wiring lead extends along an outer portion of the thermal fuse and substantially aligned with the first lead, and a second wiring lead extends along the outer portion of the thermal fuse and substantially aligned with the second lead.

In another aspect of the present invention an electric motor incorporates a stator assembly in accordance with the present invention.

In still another aspect of the present invention, a fuel pump includes an electric motor using a stator assembly in accordance with the present invention.

These and other advantages and features of the present invention will be apparent to one of ordinary skill in the art upon reading the following description of several preferred embodiments of the invention and referring to the attached drawings.

DETAILED DESCRIPTION OF THE PREFERRED EMBODIMENTS

The present invention is described in terms of a stator assembly adapted for use in an electric motor driven submersible fuel pump such as may be found on modern jet aircraft. It will be appreciated that the present invention is not so limited in application, and one of ordinary skill in the art will appreciate that its broad application extends beyond the exemplary embodiments described herein.

Figure 1:
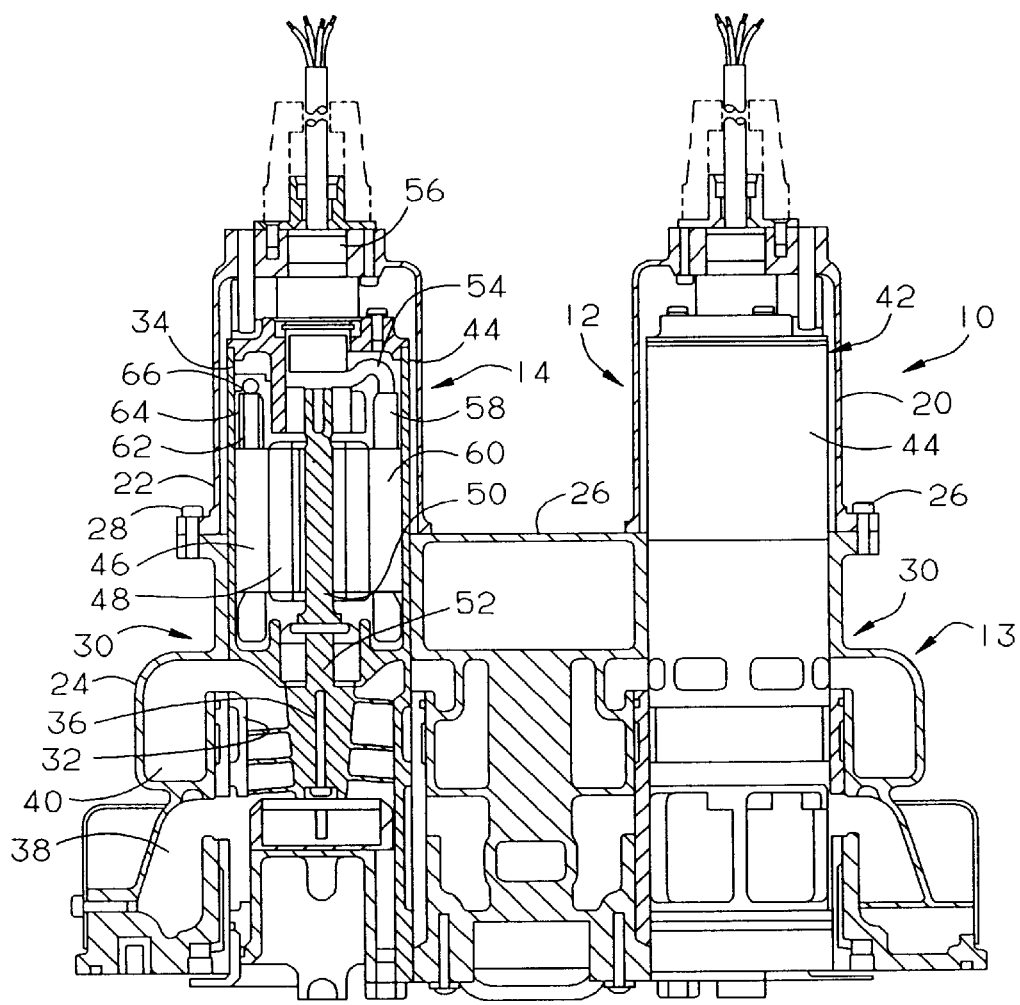
FIG. 1 is a view of fuel pump assembly partially broken away and partially shown in section including at least one electric motor in accordance with a preferred embodiment of the present invention.

Referring to FIG. 1, a fuel pump assembly 10 includes a first electric motor driven fuel pump unit 12 and a second electric motor drive fuel pump unit 14 fitted within a housing assembly 16. Housing assembly 16 is illustrated partially broken away to reveal fuel pump unit 12, and fuel pump unit 14 is shown in cross-section to better illustrate the present invention. Housing assembly 16 is preferably formed from a plurality of housing members, such as housing members 20, 22, 24 and 26, interconnected using threaded fasteners, such as fastener 28, as is well known in the art. Housing assembly 16 includes for each fuel pump unit 12 and 14 a scroll housing portion 30 including an impeller cavity 32 and a motor cavity 34. Journally supported within impeller cavity 32 is an impeller 36. Rotation of impeller 36 within impeller cavity 32 causes fuel to be drawn from the fuel tank through inlet 38 and discharged under pressure through outlet 40.

Disposed within motor cavity 34 is an electric motor 42 which is contained within a motor housing 44. Within motor housing 44 there is disposed a stator 46 and a rotor 48 journally supported within stator 46. Rotor 48 includes an output shaft portion 50 coupled to an input shaft portion 52 of impeller 36 for imparting rotating torque to impeller 36. Electrical lead wires 54 extend from stator 46 through a connector 56 and outwardly from housing 16. End turns 58 of the stator coils extend axially from each end of a stator core 60 and have an outer cylindrical surface 62. An "air gap" 64 is formed between outer surface 62 and an inner surface 66 of motor housing 44. Air gap 64 is difficult to see in FIG. 1, but is more clearly represented as gap "d" in FIG. 2. Preferably gap "d" is at least about 0.050 inch.

Figure 2:
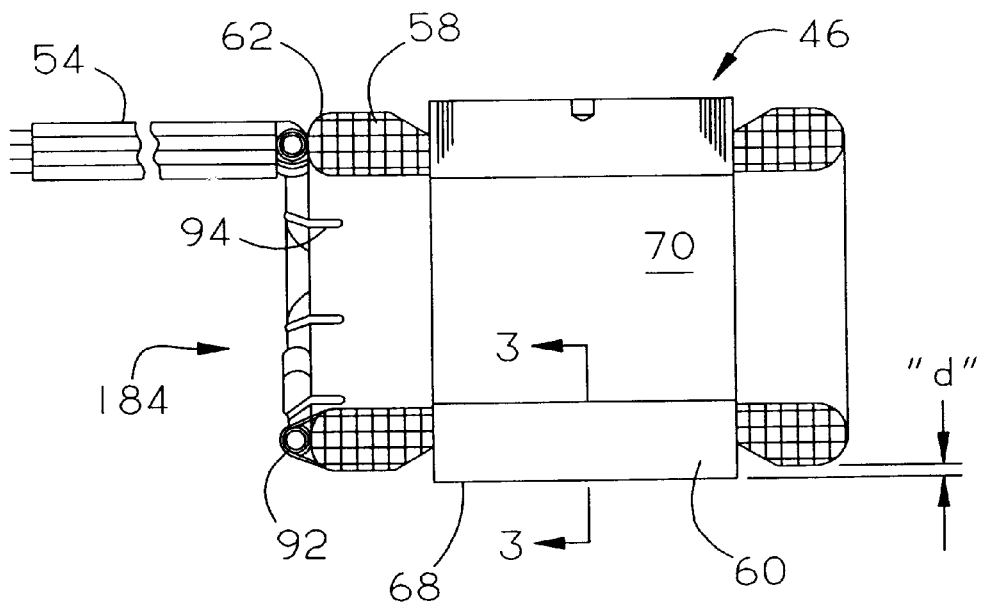
FIG. 2 is a cross-section view of a stator assembly in accordance with a preferred embodiment of the present invention.
Figure 3:
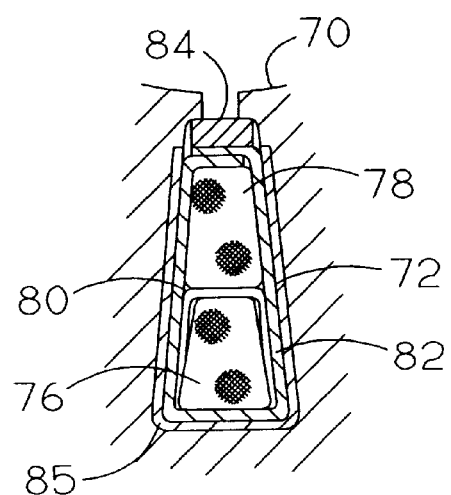
FIG. 3 is a cross-section view taken along line 3—3 of FIG. 2.
Figure 4:
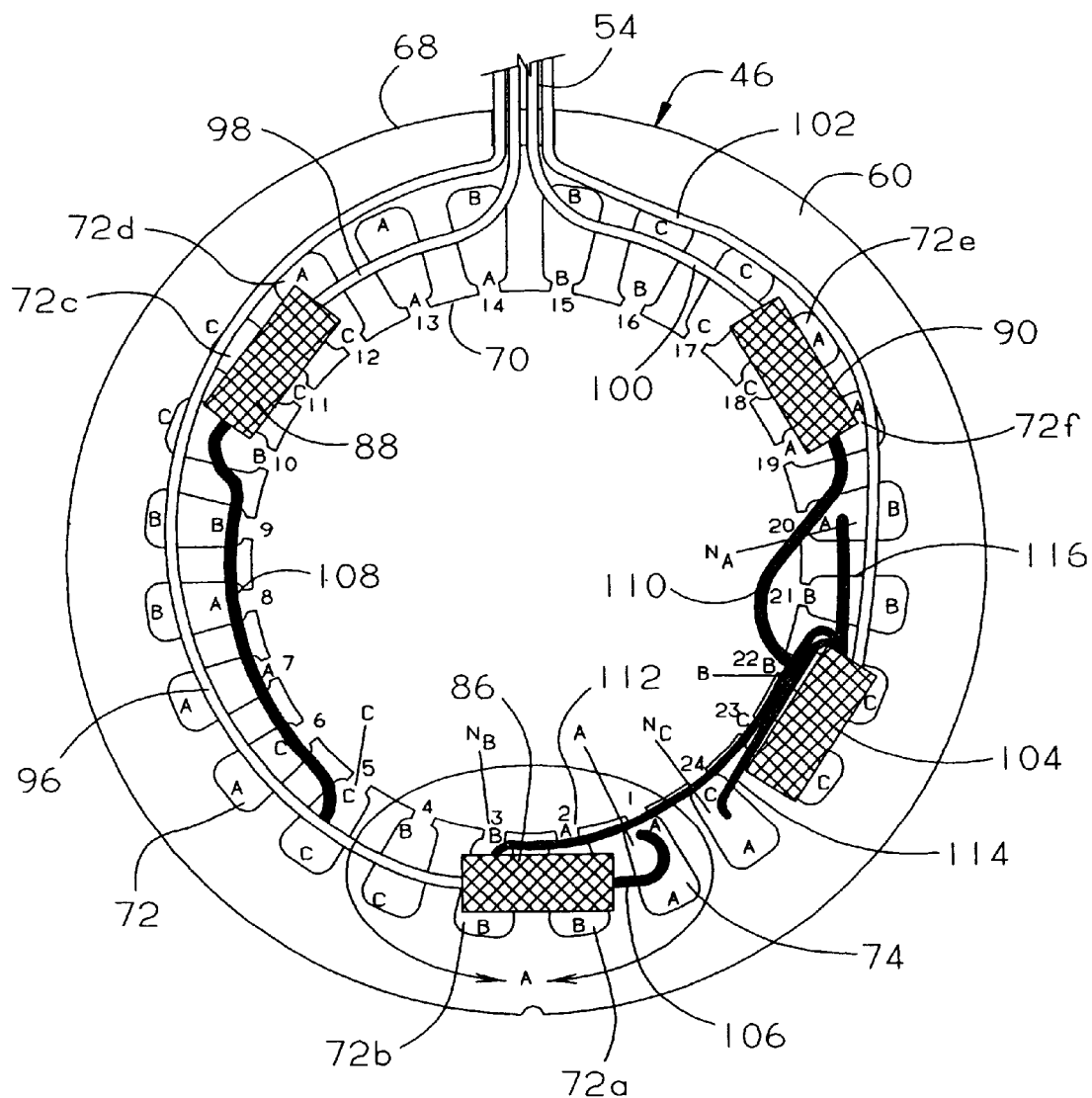
FIG. 4 is a end view of the stator assembly shown in FIG. 2 illustrating the wiring connections thereof.

Referring now to FIGS. 2–4 stator core 60 includes an outer surface 68 and an inner surface 70. Inner surface 70 is formed with a plurality of axially extending coil slots (one of which is identified as 72), which beginning with a first coil slot 74, are substantially uniformly distributed circumferentially around inner surface 70. Best seen in FIG. 3, each coil slot 72 is arranged to receive a first portion 76 of a coil and a second portion 78 of a coil, within a slot liner 85 disposed between each of first portion 76 and second portion 78 and slot 72. It will be appreciated first portion 76 and second portion 78 may be portions of a single phase of the motor or portions of a first phase, a second phase or additional phases of the motor. A coil separator 80 is disposed between the first portion 76 and the second portion 78, and leader paper 82 is disposed around each of first portion 76 and second portion 78. A slot wedge 84 is secured within slot 72 to retain first portion 76 and second portion 78 therein. It will be appreciated that in this respect, stator 46 is of conventional design. It should be further appreciated that the present invention has application to all multi-phase motor stators, and further that the invention is not limited to two coil portions per slot.

Motor 42 is preferably a multi-phase alternating current motor. The coils of stator 46 are therefore divided into groups, one each associated with each phase of motor 42. This is illustrated in FIG. 4 by the letters "A", "B" and "C" adjacent slots 72 to signify to which group the coil portions disposed within the respective slots are associated (the coils themselves have been omitted from FIG. 4). In accordance with the present invention, first slot 74 is identified from the plurality of slots 72. Coil portions associated with a first phase, shown as phase "A" in FIG. 4, are exclusively disposed in first slot 74 during construction of stator 46. The remaining portions of the coils are then disposed in the appropriate orientation, as indicated by the "A", "B", "C" designations, within the remaining slots 72 to form stator 46. This feature of the present invention is beneficial, as will be described, to the further construction of motor 42.

With reference to FIGS. 2 and 4, thermal fuses 86, 88 and 90 are secured to an axial end 92 of end turns 58. The fuses are laced to the end turns using electrical cable lacing 94. More particularly, fuses 86, 88 and 90 are arranged in a predetermined orientation with respect to first slot 74. That is, fuse 86 is preferably positioned over slots (indicated as 72a and 72b) immediately adjacent to first slot 74. Because slot 74 is occupied by portions of a coil associated with a single, known phase, this arrangement ensures that fuse 86 is disposed adjacent coil portions also associated with a single phase, phase "B" as shown in FIG. 4. Fuses 88 and 90 are then positioned in predetermined locations (e.g., slots 72c and 72d and slots 72e and 72f, respectively), with respect to first slot 74. Again, knowing that first slot 74 is occupied by coil portions associated with a single, known phase, locations for fuses 88 and 90 are determined with respect to first slot 74 that will result in fuses 88 and 90, similar to fuse 86, being disposed adjacent coil portions respectively associated with a single phase.

Fuses 86, 88 and 90 are coupled via lead wires 96, 98 and 100, respectively, which extend from the fuses around the circumference of stator 46 and form or couple to lead wires 54. A neutral lead wire 102 may be provided to couple to neutral connection 104. Magnet wires 106, 108 and 110, couple fuses 86, 88 and 90 to their respective phase coils, and magnet wires 112, 114 and 116 couple the phase coils to neutral connection 104.

As a result of the above-described construction for stator 46, a failure in the wiring connections to fuses 86, 88 and 90, or within the fuses themselves, is much less likely to result in a short-circuit between coils associated with different phases. Thus, a differential voltage resulting from a short-circuit associated with the fuse will be substantially limited to line voltage, and hence, an energy discharge associated with such a failure will be correspondingly reduced. Further, and because fuses 86, 88 and 90 are disposed adjacent axial end 92 of end turns 58, gap 64 is not compromised as may result if fuses 86, 88 and 90 were disposed adjacent outer surface 62. Thus, the full width of gap 64 is maintained to dissipate the energy of a resulting discharge, reducing the likelihood of a perforation of motor housing 44.

Figure 5:
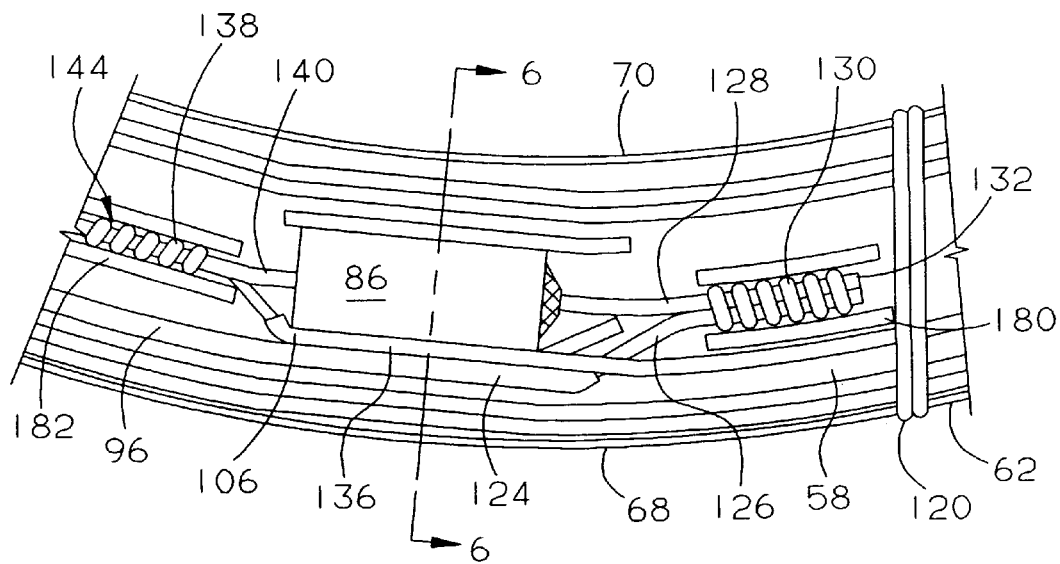
FIG. 5 is an enlarged view of a portion of the stator assembly within circle "A" of FIG. 4.
Figure 6:
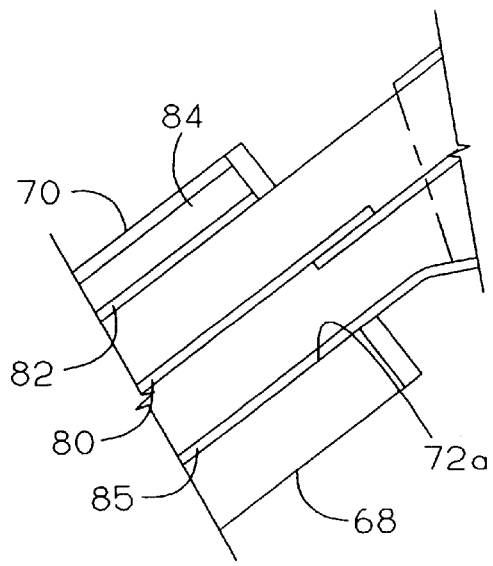
FIG. 6 is a cross-section view taken along line 6—6 of FIG. 5.
Figure 7:
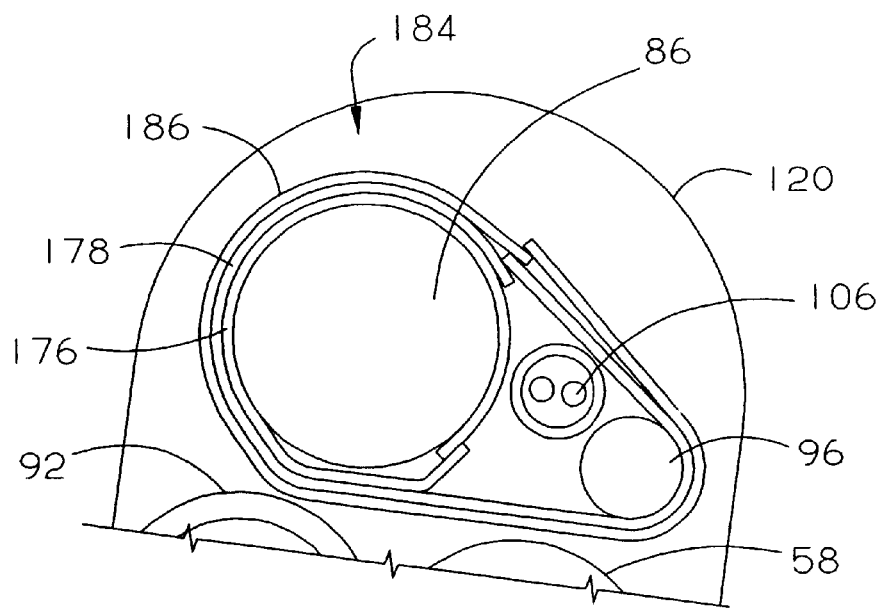
FIG. 7 is an enlarged view of the portion of the stator assembly within circle "B" of FIG. 6.

With specific reference now to FIGS. 5–7, the connection of lead wires 96, 98 and 100 and magnet wires 106, 108 and 110 to fuse 86, 88 and 90, respectively, are described in more detail. The following discussion, while referring specifically to fuse 86, is applicable to each of the fuses. Of course, it will be appreciated that physical orientation of the fuse with respect to stator 46 may be changed as required to simplify the interconnections while preserving the benefits of the inventive wiring connection.

Fuse 86 is preferably positioned closely adjacent to and in thermal contact with an axial end 92 of end turns 58 and substantially centered over the first portion 114 and second portion 116 of the coils disposed in the slots 72a and 72b. First portion 114 and second portion 116 are separated by a coil or phase separator 118, as the case may be, and lacing 120 is used to secure fuse 86 to axial end 92. Lacing 120 preferably does not extend directly over fuse 86 and/or the wiring interconnection associated therewith, in order to limit the possibility of inflicting damage to fuse 86 or the wiring interconnections during assembly of stator 46.

As best seen in FIG. 5, lead wire 96 extends along the outer portion 122 (radially outward with respect to a centerline of stator 46) of fuse 86. Lead wire 96 includes an insulation covering 124 and an exposed wire end 126 that extends parallel with a first fuse lead 128 of fuse 86, which is arranged substantially parallel to a circumference of stator 46. Fuse lead 128 and wire end 126 are wrapped using buss wire 130 to form a wiring interconnection 132. Wiring interconnection 132 is preferably completed by soldering, using a pot soldering technique, to ensure a good electrical coupling of termination lead 128 and wire end 126. Pot soldering, as one of skill in the art will appreciate, includes the steps of cleaning the interconnection using a suitable flux and then dipping the interconnection into a pot of molten solder. The buss wire ensures a uniform amount of solder is deposited on and electrically interconnects the fuse lead with the wire end.

Magnet wire 106 extends along the outer portion 122 of fuse 86. Magnet wire 106 includes and insulation covering 136 and an exposed wire end 138 that extends parallel to a second fuse lead 140 of fuse 86. Termination lead 140 is wrapped with exposed magnet wire 138 and the resulting interconnection 144 is soldered using a pot soldering technique.

Disposing lead wire 96 and magnet wire 106 along outer portion 122 provides an added level of fault protection to stator 46. That is, lead wire 96 and magnet wire 106 provide added layers of material through which an energy discharge resulting from a failure of fuse 86 will have to traverse prior to reaching gap 64. The additional material offered by lead wire 96 and magnet wire 106 absorbs a portion of the energy of a resulting energy discharge, thereby reducing the energy that is dissipated in air gap 64. A similar, although perhaps less effective and thus less preferred arrangement, is achieved by placing only one of the lead wire 96 or magnet wire 106 on along outer portion 122.

Figure 8:
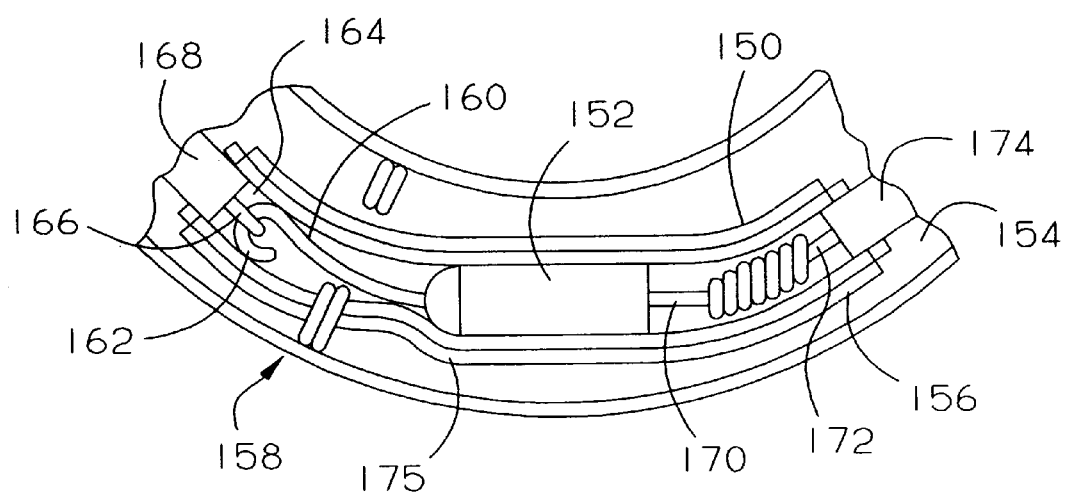
FIG. 8 is an enlarged view of a portion of a stator assembly in accordance with the prior art illustrating the connection of a thermal fuse to the stator assembly.

Referring to FIG. 8, wiring interconnections for a fuse 152 in accordance with the prior art is shown to distinguish the advantages of the present invention. Fuse 152 is disposed along the axial end 154 of end turns 156 of a stator 158. A first fuse lead 160 is formed with a hook portion 162 which engages a hook portion 164 formed on a wire end 166 of a lead wire 168. The resulting joint is then soldered. A second fuse lead 170 is wrapped with a wire end 172 of magnet wire 174 and soldered. As will be appreciated, fuse 152 is not framed on its inner and outer portions by lead wire 168 and magnet wire 174. Additionally, fuse 152 is coupled to lead wire 168 and magnet wire 174 and then fuse 152 and the resulting interconnections are wrapped with insulation tape 150.

The arrangement of wiring interconnections shown in FIG. 8 can result in axially stresses, as a result of thermal cycling and vibration, being imposed directly on fuse 152 through leads 160 and 170. These axially stresses may lead to fuse failure. In the present invention, axially stresses may be absorbed in the bends of lead wire 96 and magnet wire 106, and hence may not be directly communicated to fuse 86. In addition, the arrangement of insulation tape 150 shown in FIG. 8 may not adequately isolate fuse 152 and each of the interconnections.

Referring again to FIGS. 5–7, multiple layers of insulation are disposed about fuse 86, interconnection 132 and interconnection 144 to further reduce the likelihood of fuse failure and/or a short-circuit resulting from a fuse failure. A preferred insulation is a commercially available adhesive backed polyimide tape, and fuse 86, interconnection 132 and interconnection 144 are wrapped with insulation tape. More particularly, tape 176 is disposed between lead wire 96 and magnet wire 106 and fuse 86. Lead wire 96 and magnet wire 106 are then wrapped to fuse 86 using insulation tape 178. Individually, once the pot soldering operation is completed, interconnections 132 and 144, are wrapped using insulation tape 180 and 182, respectively. Then, the entire fuse assembly 184 is wrapped with insulation tape 186 before being secured to axial end 118 by lacing 120. Selective application of insulation tape reduces the bulk of the assembly 184, yet provides significant protection against both fuse failure and a short-circuit resulting from a fuse failure.

Each of the above-described features of the present invention individually and collectively reduce the likelihood of motor failure and/or reduce the magnitude of an energy discharge associated with a motor failure. These features provide a stator assembly particularly well suited for using in electric motor driven fuel pump applications. Of course, the features of the present invention have applicability to virtually any electric motor driven application where reliability and failure management are required. Therefore, the scope of the present invention is not limited to the foregoing description of the preferred embodiments, but instead is only limited by the scope of the subjoined claims.

We claim:

1. For use in an electric motor, a stator assembly comprising:

an annular stator core having an inner diameter and an outer diameter, the inner diameter formed to include a plurality of longitudinally extending winding slots extending from a first end of the stator core to a second end of the stator core;

a plurality of windings disposed within the plurality of winding slots beginning with a first of the plurality of winding slots, the plurality of windings being coupled into at least one winding group associated with at least a first phase, each winding having a first winding end and a second winding end extending from the first end and the second end, respectively, and a first winding portion of the at least one winding group disposed within the first winding slot;

at least one thermal fuse disposed in thermal contact with the first winding end and substantially adjacent to the first winding portion, the at least one thermal fuse having a first lead and a second lead;

a first wiring lead coupling the first lead to the first winding portion;

a second wiring lead coupling to the second lead and arranged for coupling to an excitation current source.

2. The stator assembly of claim 1, wherein the first lead and the second lead are substantially aligned with a circumference of the stator core, the first wiring lead extending along an outer portion of the thermal fuse and substantially aligned with the first lead, the second wiring lead extending along the outer portion of the thermal fuse and substantially aligned with the second lead.

3. The stator assembly of claim 2, further comprising buss wire wrapped around the second lead and the second wiring lead.

4. The stator assembly of claim 3, further comprising a solder connection coupling each of the first lead to the first wiring lead and the second lead to the second wiring lead.

5. The stator assembly of claim 3, further comprising a layer of insulation disposed about each of the first buss wire portion and the second buss wire portion.

6. The stator assembly of claim 3, further comprising a first layer of insulation disposed around the thermal fuse.

7. The stator assembly of claim 6, further comprising a second layer of insulation disposed around the thermal fuse, the first wiring lead and the second wiring lead.

8. The stator assembly of claim 7, further comprising a third layer of insulation disposed around the second layer of insulation.

9. An electric motor comprising the stator assembly of claim 1.

10. A fuel pump comprising the electric motor of claim 9.

11. For use in an electric motor, a stator assembly comprising:
- an annular stator core having an inner diameter and an outer diameter, the inner diameter formed to include a plurality of longitudinally extending winding slots extending from a first end of the stator core to a second end of the stator core;
- a plurality of windings disposed within the plurality of winding slots, the plurality of windings being coupled to form a first winding group, a second winding group and a third winding group respectively associated with a first phase, a second phase and third phase, each winding having a first winding end and a second winding end extending from the first end and the second end, respectively,
- a first thermal fuse disposed in thermal contact with the first winding end and substantially aligned with a portion of the first winding group, a second thermal fuse disposed in thermal contact with the first winding end and substantially aligned with a portion of the second winding group, a third thermal fuse disposed in thermal contact with the first winding end and substantially aligned with a first portion of the third winding group;
- each of the first thermal fuse, the second thermal fuse and the third thermal fuse including a first fuse lead and a second fuse lead, each first fuse lead coupling to a respective one of the first winding group, the second winding group and the third winding group and each second fuse lead coupling to an excitation current source.

12. The stator assembly of claim 9, a first portion of the first winding disposed in a first of the plurality of slots and the first thermal fuse, the second thermal fuse and the third thermal fuse are positioned with respect to the first slot.

13. The stator assembly of claim 11, for each thermal fuse the first fuse lead and the second fuse lead substantially aligned with a circumference of the stator core, a first wiring lead extending along an outer portion of the thermal fuse and substantially aligned with the first fuse lead and a second wiring lead extending along the outer portion of the thermal fuse and substantially aligned with the second fuse lead.

14. An electric motor comprising the stator assembly of claim 11.

15. A fuel pump comprising the electric motor of claim 14.

16. An electric motor comprising:
- a rotor journally supported for rotation within a stator assembly;
- the stator assembly comprising:
- an annular stator core having an inner diameter and an outer diameter, the inner diameter formed to include a plurality of longitudinally extending winding slots extending from a first end of the stator core to a second end of the stator core;
- a plurality of windings disposed within the plurality of winding slots, the plurality of windings being coupled to form a first winding group, a second winding group and a third winding group respectively associated with a first phase, a second phase and third phase, each winding having a first winding end and a second winding end extending from the first end and the second end, respectively,
- a first thermal fuse, a second thermal fuse and a third thermal fuse each disposed in thermal contact with the first winding end;
- a first portion of the first winding group disposed in a first of the plurality of slots and the first thermal fuse, the second thermal fuse and the third thermal fuse positioned with respect to the first slot and substantially adjacent the first winding group, the second winding group and the third winding group, respectively;
- each of the first thermal fuse, the second thermal fuse and the third thermal fuse including a first fuse lead, each first fuse lead coupling to a respective one of the first winding group, the second winding group and the third winding group; and a second fuse lead coupling to an excitation current source.

17. A fuel pump comprising:
- a scroll housing including a motor chamber and an impeller chamber, a fuel inlet in fluid communication with the impeller chamber and a fuel outlet in fluid communication with the impeller chamber;
- an impeller disposed journally disposed within the impeller chamber, the impeller including an input shaft;
- an electric motor disposed within the motor chamber and including an output shaft coupled to the input shaft and to a rotor, the rotor journally supported within a stator, the stator comprising:
- an annular stator core having an inner diameter and an outer diameter, the inner diameter formed to include a plurality of longitudinally extending winding slots extending from a first end of the stator core to a second end of the stator core;
- a plurality of windings disposed within the plurality of winding slots, the plurality of windings being coupled to form a first winding group, a second winding group and a third winding group respectively associated with a first phase, a second phase and third phase, each winding having a first winding end and a second winding end extending from the first end and the second end, respectively,
- a first thermal fuse, a second thermal fuse and a third thermal fuse each disposed in thermal contact with the first winding end;

a first portion of the first winding group disposed in a first of the plurality of slots and the first thermal fuse, the second thermal fuse and the third thermal fuse positioned with respect to the first slot and substantially adjacent the first winding group, the second winding group and the third winding group, respectively;

each of the first thermal fuse, the second thermal fuse and the third thermal fuse including a first fuse lead, each first fuse lead coupling to a respective one of the first winding group, the second winding group and the third winding group; and a second fuse lead coupling to an excitation current source.

18. A method of making a stator comprising the steps of:

providing an annular stator core, the stator core having a plurality of winding slots extending longitudinally from a first end to a second end;

positioning a plurality of windings within the winding slots with a first end of the windings extending from the first end of the stator core;

disposing a thermal fuse in thermal contact with a first end of the plurality of windings and aligning the thermal fuse with a first phase portion of the windings.

19. The method of claim 18, further comprising the steps of:

disposing a second thermal fuse in thermal contact with the first end and aligning the second thermal fuse with a second phase portion of the windings.

20. The method of claim 18, wherein the step of disposing a thermal fuse comprises disposing a thermal fuse in thermal contact with a first longitudinal end of the plurality of windings.

21. The method of claim 18, further comprising the steps of identifying a first slot of the plurality of winding slots; and disposing a first winding portion of the first phase portion within the first slot.

22. The method of claim 21, wherein the step of aligning comprises aligning the thermal fuse with respect to the first slot.

* * * * *